United States Patent [19]

Lee

[11] Patent Number: 5,418,876
[45] Date of Patent: May 23, 1995

[54] FIBER OPTIC CONNECTOR WITH EPOXY PREFORM

[75] Inventor: Hsin Lee, Issaquah, Wash.

[73] Assignee: Augat Communications Products, Inc., Kent, Wash.

[21] Appl. No.: 198,815

[22] Filed: Feb. 18, 1994

[51] Int. Cl.⁶ .................................................. G02B 6/36
[52] U.S. Cl. ............................. 385/80; 385/60; 385/72; 385/85
[58] Field of Search .............. 385/80, 60, 72, 76, 385/77, 78, 139, 85

[56]  References Cited

U.S. PATENT DOCUMENTS

| Re. 34,005 | 7/1992 | Levinson et al. ................. 385/80 |
| 4,148,554 | 4/1979 | Magnusson et al. ............... 385/85 |
| 4,204,306 | 5/1980 | Makuch ............................ 385/80 X |
| 4,291,943 | 9/1981 | Binek et al. ...................... 385/56 |
| 4,303,304 | 12/1981 | Ruiz ................................. 385/80 |
| 4,362,356 | 12/1982 | William et al. .................... 385/80 |
| 4,432,603 | 2/1984 | Morency et al. ................... 385/59 |
| 4,440,469 | 4/1984 | Schumacher ..................... 385/80 X |
| 4,790,622 | 12/1988 | Levinson et al. ................. 385/80 |
| 4,812,007 | 3/1989 | Lukas .............................. 385/60 |
| 4,984,865 | 1/1991 | Lee et al. ......................... 385/53 |
| 5,013,124 | 5/1991 | Focht ............................... 385/56 |
| 5,031,984 | 7/1991 | Eide et al. ........................ 385/27 |
| 5,064,268 | 11/1991 | Morency et al. ................... 385/87 |
| 5,193,133 | 3/1993 | Schofield et al. ................. 385/80 X |

OTHER PUBLICATIONS

Multi-Seals, Inc., Connection Technology, "Using Epoxy Pre-forms to Environmentally Seal Connectors" Oct. 1989.

3M Telecom Systems Group, Product Bulletin, "6100 Hot Melt Fiber Optic Connector" 1992 No Month.

*Primary Examiner*—Frank Gonzalez
*Assistant Examiner*—Phan Thi Heartney
*Attorney, Agent, or Firm*—Weingarten, Schurgin, Gagnebin & Hayes

[57]  ABSTRACT

A fiber optic connector with an epoxy preform is described that facilitates integration of an optical fiber with a connector body and a ferrule. In an illustrated embodiment, the epoxy preform is a cylindrical thermosetting epoxy element having a passage therethrough adapted to receive an optical fiber of a predetermined diameter. The passage through the preform is positively secured within a cavity within the connector body to precisely align the passage with an opening in an abutting ferrule.

10 Claims, 2 Drawing Sheets

FIBER OPTIC CONNECTOR WITH EPOXY PREFORM

FIELD OF THE INVENTION

The present invention relates to fiber optic connectors, and more particularly to a fiber optic connector with a preloaded, thermosetting epoxy preform.

BACKGROUND OF THE INVENTION

Sealing materials, such as liquid epoxy, are commonly employed to mount the end of a glass or optical fiber in an assembly such as a fiber optic connector. One attribute of liquid epoxy is that is it difficult and time consuming to work with. Generally, two different compounds must be thoroughly mixed in a proper ratio for a predetermined time, then placed into a syringe which is used to apply the mixed compounds as desired. Each of these steps is technique dependant, requiring an attentive, experienced technician to achieve consistent results. Catalytic compounds have the distinct disadvantage of forcing a technician to rush to apply the mixed materials before they set or become difficult to apply. With respect to fiber optic connectors, a portion of the connector is generally filled with the epoxy and the fiber is passed therethrough. After passing the fiber through the liquid epoxy, the fiber must be threaded into a ferrule, a task made more difficult by the viscous liquid. Not infrequently, some of the liquid epoxy is inadvertently deposited on surfaces that must remain epoxy free, necessitating clean-up with an alcohol pad, for example.

An alternative to liquid epoxy is an epoxy preform. Epoxy preforms are solid shapes of one-part epoxy, stable at room temperatures. When exposed to elevated temperatures, they melt to form a rigid seal. Epoxy preforms can be configured in many shapes, such as rings or tubes, and are fabricated with dimensions having ±0.002" or tighter tolerances depending upon a particular application. Advantages of epoxy preforms include ease of use and application, consistent quality and quantity, as well as minimal waste and spillage.

U.S. Pat. No. 4,984,865 to Lee et al., discloses a fiber optic connector that includes a thermoplastic slug disposed in a hollow of a connector body. The thermoplastic slug has a longitudinal opening through which an optical fiber is passed. Heat is applied to liquify the thermoplastic slug to cause it to bond to the optical fiber and the wall of the hollow. However, thermoplastic epoxies are disadvantageous in applications wherein the fiber optic connector is subjected to heat, as the epoxy can soften or even become displaced, thereby destroying the connection, rendering the fiber unstable and susceptible to breakage, and permitting contaminants to enter the connector body.

Further with respect to the connector disclosed by Lee, the thermoplastic slug is not positively retained within the hollow, allowing the slug to either be partially displaced, thereby placing the longitudinal opening through the slug, having a diameter not much greater than the fiber, out of alignment with an opening in a ferrule against which the slug abuts. Worse yet, the connector configuration in Lee can easily permit the slug to become completely dislodged, and possibly lost, if the opening in the connector through which the slug is introduced is not maintained in a substantially upright orientation.

A need exists for a fiber optic connector which facilitates rapid, yet precise connection of an optical fiber with a connector body, while providing a heat tolerant epoxy seal between the fiber, the connector body, and a ferrule.

SUMMARY OF THE INVENTION

The present invention overcomes the disadvantages described above by providing a fiber optic connector with an adhesive preform having an outer diameter greater than of a bore through the fiber optic connector. The preform is positively secured within a cavity defined by a portion of the fiber optic connector to precisely align the passage with an opening in an abutting ferrule.

In an illustrative embodiment, the preform is a cylindrical thermosetting epoxy element having a passage adapted to receive an optical fiber of a predetermined diameter. The preform is positively secured within a cavity defined by the connector body by an annular seat and an abutting ferrule having a conical inlet to a longitudinal passage adapted to receive the optical fiber. The seat and the inlet maintain the passage in precise alignment to facilitate introduction of the fiber into the connector body, through the preform, and into the passage in the ferrule.

The present invention further includes a method of providing a connection between a fiber optic cable and the fiber optic connector of the invention.

BRIEF DESCRIPTION OF THE DRAWING

The invention will be more fully understood by reference to the following detailed description when considered in conjunction with the accompanying drawings, in which.

DETAILED DESCRIPTION OF THE PREFERRED EMBODIMENT

Figure 1:
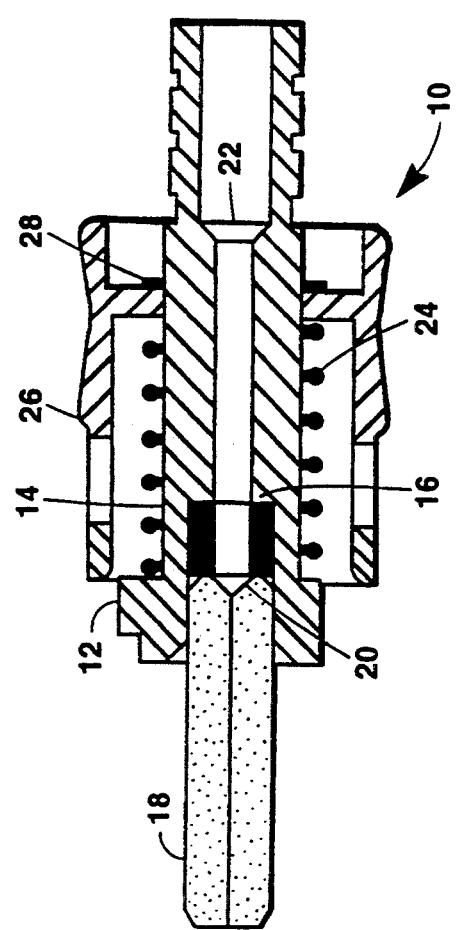
FIG. 1 is a sectional view of a fiber optic connector of the invention.

FIG. 1 is a sectional view of a fiber optic connector 10 of the invention. The connector 10 includes a connector body 12 having a bore or passage therethrough. The connector body 12 has a first end adapted to receive an adhesive preform 14, such as a dry epoxy. In the illustrated embodiment, the preform 14 is a thermosetting epoxy having a cylindrical shape with a central passage therethrough. The thermosetting epoxy preform 14 retains its manufactured configuration at normal room temperatures, allowing it to be conveniently available when ready for insertion into the connector.

An important characteristic of thermosetting plastic is that once subjected to a heating cycle wherein it becomes flowable, then allowed to cool and harden, it will not soften or become flowable again if subjected to another heating cycle. This provides a particular advantage in applications wherein the connector 10 is mated to heat producing equipment or is located in a thermally hostile environment, because a seal or mate provided by the thermosetting epoxy is assured.

Insertion depth of the preform 14 into the first end of the connector body 12 is limited by an engagement portion such as a shoulder or an annular seat 16. A ferrule 18 is positioned within the first end of the connector body 12 in an abutting relationship with the preform 14. The preform is thus held snugly in position and cannot become dislodged from the connector 10 unless the ferrule 18 is removed therefrom. In one embodiment, the end of the ferrule 18 abutting the preform 14 has a conical inlet 20 leading to a passage through the ferrule. The conical inlet 20 guides an optical fiber to be mated with the ferrule 18 into the passage. In this embodiment, the passage through the connector body 12 and the preform 14 leading to the ferrule 18 has a diameter at least as great as the diameter of the conical inlet 20 to further facilitate introduction of an optical fiber into the ferrule.

The connector body has a second end adapted to receive a fiber optic cable and includes an abutment surface 22 to limit an insertion distance of a portion of the fiber optic cable. In the illustrated embodiment, the abutment surface has a frustroconical shape that facilitates guiding an optical fiber into the passage through the connector body 12. The connector 10 further includes a spring 24, a nut 26, and a C-clip 28 used to secure the connector 10 to other equipment (not shown).

Figure 2:
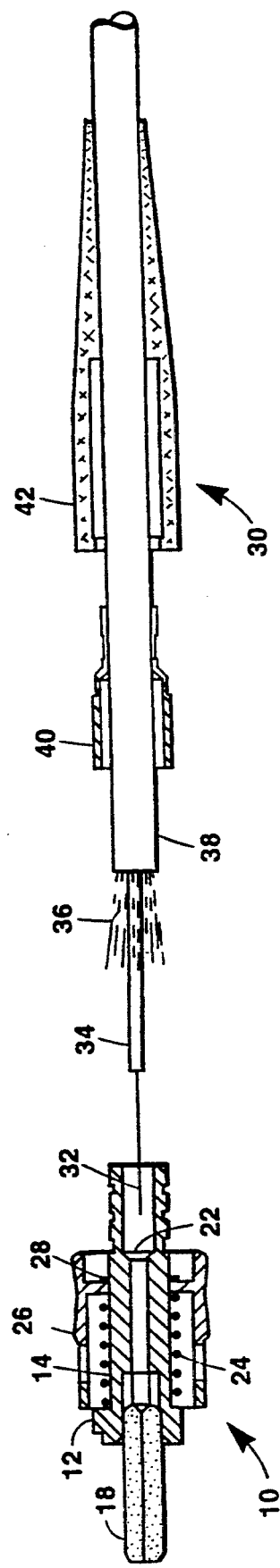
FIG. 2 is an exploded sectional view of the fiber optic connector of FIG. 1, aligned with a fiber optic cable prepared for mating.

Advantageous features of the connector 10, as well as a method of providing a connection between a fiber optic cable and the fiber optic connector of the invention, are better appreciated by referring to FIG. 2 which is an exploded sectional view of the fiber optic connector of FIG. 1, aligned with a fiber optic cable 30 prepared for mating. The exemplary fiber optic cable 30 includes an optical fiber 32, a buffer 34, and Kevlar ® fibers 36 encased in an outer jacket 38. A crimp sleeve 40 and boot 42 are disposed on the outer jacket 38.

In an exemplary embodiment, the fiber optic cable 30 is prepared for mating to the connector 10 by retracting the boot 42 from the crimp sleeve 40; and stripping from one end of the cable approximately 38 mm of the outer jacket 38, 32 mm of the fibers 36, and 25 mm of the buffer 34 to expose approximately 25 mm of the optical fiber 32.

Mating the prepared fiber optic cable 30 to the connector 10 is accomplished by the following steps. As a preliminary matter, the exposed fiber 32 is slightly bent to ensure that no nicks occurred during stripping. If the fiber was nicked, it will easily break. The exposed fiber 32 is then cleaned by drawing it through an alcohol pad. Next, the fiber is inserted into the second end of the connector body 12 while the fibers 36 surround the second end of the connector body 12. The crimp sleeve 40 is slid over the fibers and crimped with an appropriate crimp die to the second end. The boot 42 is then slid over the crimped connection. During the insertion process, the optical fiber 32 has traveled through the passage in the connector body 12, the preform 14, and the ferrule 18.

In embodiments wherein the preform 14 is a thermosetting epoxy, the connector 10 is subsequently heated to deform or cause the thermosetting epoxy preform 14 to flow, and then cure, thereby securing the optical fiber 32 within the connector 10. The cured thermosetting epoxy preform is then allowed to cool. In the exemplary embodiment, the connector is heated for 20–30 minutes at 150° C. to fully cure.

Normally, a portion of the optical fiber 32 extends beyond the free end of the ferrule 18. The extending portion is removed and the end of the ferrule 18 is prepared for optical connection using cutting and polishing techniques known in the art.

Many modifications of the presently disclosed invention will become apparent to those skilled in the art having benefitted from the instant disclosure.

What is claimed is:

1. A fiber optic connector comprising:
   a connector body including a first end defining a first cavity having a predetermined diameter, a second end defining a second cavity having a predetermined diameter, and a bore therethrough connecting said first cavity to said second cavity, said bore having a diameter less than said diameter of said first cavity;
   an adhesive preform, having a passage therethrough, disposed within said first cavity proximate said bore, said adhesive preform having an outer diameter greater than said diameter of said bore and a passage diameter no less than said diameter of said bore, and said passage being aligned with said bore; and
   a ferrule having a first end disposed within said first cavity proximate said adhesive preform and a second end extending from said connector body, said ferrule having a passage therethrough aligned with said passage of said adhesive preform.

2. The fiber optic connector of claim 1, wherein said second cavity has a diameter greater than said diameter of said bore.

3. The fiber optic connector of claim 2, wherein said connector body includes a frustroconical portion between said second cavity and said bore.

4. The fiber optic connector of claim 1, wherein said adhesive preform is an epoxy preform.

5. The fiber optic connector of claim 4, wherein said epoxy is a thermosetting epoxy preform.

6. The fiber optic connector of claim 5, wherein said thermosetting epoxy preform has a cylindrical configuration.

7. The fiber optic connector of claim 1, wherein said first end of said ferrule has a tapered inlet having an inlet entry diameter no less than said diameter of said bore.

8. A fiber optic connector comprising:
   a connector body including a first end defining a first cavity having a predetermined diameter, a second end defining a second cavity having a predetermined diameter, and a bore therethrough connecting said first cavity to said second cavity, said first and said second cavity having a diameter greater than said diameter of said bore, and a frustroconical portion between said second cavity and said bore;
   a cylindrical, thermosetting epoxy preform, having a passage therethrough, disposed within said first cavity proximate said bore, said thermosetting epoxy preform having an outer diameter greater than said diameter of said bore and a passage diameter no less than said diameter of said bore, and said passage being aligned with said bore; and
   a ferrule having a first end disposed within said first cavity proximate said thermosetting epoxy preform and a second end extending from said connector body, said first end of said ferrule including a tapered inlet having an inlet entry diameter no less than said diameter of said bore leading to a passage through said ferrule that is aligned with said passage of said thermosetting epoxy preform.

9. A method of providing a fiber optic connection between a fiber optic cable and a fiber optic connector, comprising the steps of:

providing a fiber optic connector having,
- a connector body including a first end defining a first cavity having a predetermined diameter, a second end defining a second cavity having a predetermined diameter, and a bore therethrough connecting said first cavity to said second cavity, said bore having a diameter less than said diameter of said first cavity,
- a thermosetting epoxy preform, having a passage therethrough, disposed within said first cavity proximate said bore, said thermosetting epoxy preform having an outer diameter greater than said diameter of said bore and a passage diameter no less than said diameter of said bore, and said passage being aligned with said bore, and
- a ferrule having a first end disposed within said first cavity proximate said thermosetting epoxy preform and a second end extending from said connector body, said ferrule having a passage therethrough aligned with said passage of said thermosetting epoxy preform;

preparing a fiber optic cable by exposing a length of optical fiber;

inserting said optical fiber in turn through said second cavity, said bore, said thermosetting epoxy preform, and said ferrule;

heating said fiber optic connector; and allowing said fiber optic connector to cool.

10. The method of claim 9, wherein said heating step is accomplished at approximately 150° C. for 20 to 30 minutes.

* * * * *